United States Patent
Osterman et al.

(10) Patent No.: US 10,871,653 B1
(45) Date of Patent: Dec. 22, 2020

(54) VIEWING DIRECTION INDEPENDENT SINGLE-LAYER, PIXELATED LIGHT DIMMING FILTER

(71) Applicant: LC-TEC Displays AB, Borlänge (SE)

(72) Inventors: Jesper Osterman, Falun (SE); Fredrik Kihlborg, Falun (SE); Terry J. Scheffer, Hilo, HI (US)

(73) Assignee: LC-TEC Displays AB, Borlänge (SE)

( * ) Notice: Subject to any disclaimer, the term of this patent is extended or adjusted under 35 U.S.C. 154(b) by 0 days.

(21) Appl. No.: 16/496,104

(22) PCT Filed: Apr. 24, 2019

(86) PCT No.: PCT/US2019/028857
§ 371 (c)(1),
(2) Date: Sep. 20, 2019

(87) PCT Pub. No.: WO2019/209911
PCT Pub. Date: Oct. 31, 2019

Related U.S. Application Data

(60) Provisional application No. 62/662,040, filed on Apr. 24, 2018.

(51) Int. Cl.
*G02B 27/01* (2006.01)
*G09G 5/10* (2006.01)

(52) U.S. Cl.
CPC .......... *G02B 27/0172* (2013.01); *G09G 5/10* (2013.01); *G02B 2027/0118* (2013.01); *G02B 2027/0178* (2013.01); *G09G 2360/141* (2013.01); *G09G 2360/144* (2013.01)

(58) Field of Classification Search
USPC ............................................................ 345/7
See application file for complete search history.

(56) References Cited

U.S. PATENT DOCUMENTS

| 2012/0044431 | A1* | 2/2012 | Osterman | H04N 13/341 349/15 |
| 2012/0154920 | A1 | 6/2012 | Harrison et al. | |
| 2012/0249797 | A1* | 10/2012 | Haddick | G06F 3/016 348/158 |
| 2012/0249895 | A1* | 10/2012 | Kaifu | H04N 5/238 349/1 |

(Continued)

*Primary Examiner* — Chineyere D Wills-Burns
(74) *Attorney, Agent, or Firm* — Stoel Rives LLP

(57) ABSTRACT

A system included in a wearable viewing device (10) prevents reduction in legibility of a near-eye image display for observation in combination with an observer's visual exterior view. The system includes a near-eye image source (14) from which emanates near-eye image-carrying light and which is positioned out of the observer's direct visual exterior view. A dimming matrix display (12) including multiple pixels is positioned so that the observer (22) can see though them a scene (30, 32) in an exterior view. A partly transparent optical element (20) is positioned so that the observer can see the scene in the exterior view and reflect the near-eye image-carrying light to provide an image for observation by the observer. A dimming controller (34) controls amounts of scene-carrying light propagating through the multiple pixels from the locations in the scene and thereby prevents wash-out of the near-eye image when outside illumination is very bright.

13 Claims, 17 Drawing Sheets

(56) References Cited

U.S. PATENT DOCUMENTS

| | | | |
|---|---|---|---|
| 2013/0113973 A1* | 5/2013 | Miao | G09G 3/003 348/333.01 |
| 2014/0340286 A1* | 11/2014 | Machida | G02B 27/0172 345/8 |
| 2015/0015814 A1 | 1/2015 | Qin | |
| 2015/0192835 A1* | 7/2015 | Kim | G09G 5/10 345/589 |
| 2015/0309264 A1* | 10/2015 | Abovitz | G02B 6/32 385/33 |
| 2016/0070101 A1* | 3/2016 | Nishizawa | G06K 9/00671 345/8 |
| 2016/0161740 A1 | 6/2016 | Bar-Zeev et al. | |
| 2016/0316195 A1* | 10/2016 | Simmons | G09G 5/10 |
| 2017/0200296 A1* | 7/2017 | Jones | G06F 40/58 |
| 2017/0276960 A1* | 9/2017 | Osterman | G02F 1/13439 |
| 2018/0084232 A1 | 3/2018 | Belenkii et al. | |
| 2018/0188536 A1* | 7/2018 | Bell | G02B 27/0093 |
| 2018/0188538 A1* | 7/2018 | Bell | G02F 1/133528 |
| 2018/0308451 A1* | 10/2018 | Saur | G02B 27/0172 |
| 2018/0314066 A1* | 11/2018 | Bell | G09G 5/10 |
| 2019/0318706 A1* | 10/2019 | Peng | G02B 26/08 |

\* cited by examiner

VIEWING DIRECTION INDEPENDENT SINGLE-LAYER, PIXELATED LIGHT DIMMING FILTER

RELATED APPLICATION

This application claims benefit of U.S. Patent Application No. 62/662,040, filed Apr. 24, 2018.

COPYRIGHT NOTICE

©2019 LC-TEC Displays AB. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to a high dynamic range, electrically controllable, single-layer, pixelated light dimming filter for use in combination with a near-eye digital image display in wearable viewing devices.

BACKGROUND INFORMATION

Augmented reality headsets and glasses are wearable computers that add virtual information to a real world scene by displaying translucent content that can be viewed by the user, while at the same time allowing visibility of the outside world surroundings. One factor that determines how distinct this augmented world is visually perceived is the brightness of the ambient environment in comparison to the brightness of the near-eye digital image display. As environmental lighting conditions change, for example, when the user goes from indoors to outdoors, the brightness ratio of the two worlds also changes, something that can result in significantly reduced legibility.

One solution for overcoming this issue is to incorporate a dimming filter that controls the amount of ambient light reaching an observer's eye from the surroundings and matches the ambient light to the light propagating from the near-eye display. Dimming filters are used in AR headsets and glasses to reduce the amount of light reaching the user from external scenes.

S. Feiner, et al. in *Personal Technologies*, Volume 1, Number 4, pp. 208-217 (1997) describes using conventional neutral density filters to reduce the intensity of outside objects in sunlight from swamping out a low light intensity headset computer-generated digital image coming from the near-eye display. However, this AR headset design has the disadvantage of over-dimming darker indoor scenes, requiring the neutral density filter to be manually changed to a less dense one.

U.S. Pat. No. 9,626,936 describes an electrically controllable dimming filter consisting of an electrochromic cell to electrically control the amount of light from an external scene without having to manually change a series of neutral density filters. However, electrochromic cells operate at relatively slow switching speeds and exhibit inherent coloration, so, in order to achieve a neutral filter, at least three electrochromic layers are required. The addition of three electrochromic layers adds complexity and cost. Furthermore, electrochromic displays work by electrochemical processes of charging and discharging, and much like a battery, they are limited by the number of charge and discharge cycles before operational failure.

In a poster presentation at the 2017 IEEE Symposium on Mixed and Augmented Reality Adjunct Proceedings, Mori, Ikeda, Sandor, and Plopski describe an AR headset prototype using a liquid crystal filter with adjustable opacity to dim the light coming from the environment. The transmission of liquid crystal devices is, however, strongly dependent on viewing direction and thereby results in angular dependent dimming that is accompanied by viewing discomfort in wearing the AR headset.

SUMMARY OF THE DISCLOSURE

The aforementioned disadvantages of prior art dimming filters are overcome by the disclosed wearable viewing device that comprises a system for preventing a reduction in legibility of a near-eye image display for observation in combination with an observer's visual exterior view. The system includes a near-eye image source from which emanates near-eye image-carrying light and which is positioned out of the observer's direct visual exterior view. A dimming matrix display includes multiple pixels and is positioned so that the observer can see the exterior view through the multiple pixels. The exterior view includes a scene, and locations in the scene viewed by the observer define lines of sight for the observer. The lines of sight intersect and pass through the multiple pixels at polar and azimuthal angles. A partly transparent optical element is positioned so that the observer can see the scene in the visual exterior view and so that the near-eye image-carrying light reflects off the partly transparent optical element to provide an image for observation by the observer. A dimming controller is operatively connected to the dimming matrix display to control amounts of scene-carrying light propagating through the multiple pixels from the locations in the scene. The scene-carrying light, as perceived by the observer, has for the lines of sight passing through the multiple pixels at their respective polar and azimuthal angles a value within an operational tolerance that prevents wash-out of the near-eye image when outside illumination is very bright.

In a preferred embodiment of the dimming matrix display, a single-layer, active matrix liquid crystal display (AMLCD) dimming filter, in which the individual pixel elements are driven with appropriate voltages, produces a uniform transmittance from the observer's perspective, irrespective of the observer's viewing direction. One preferred AMLCD liquid crystal mode uses the vertically aligned nematic (VAN) mode compensated with retarder films. Another preferred AMLCD liquid crystal mode uses the twisted nematic (TN) mode with optional film compensation.

The disclosed wearable viewing device is preferably configured for use as an augmented reality (AR) viewing device.

Additional aspects and advantages will be apparent from the following detailed description of a preferred embodiment, which proceeds with reference to the accompanying drawings.

DETAILED DESCRIPTION OF PREFERRED EMBODIMENTS

Figure 1A:
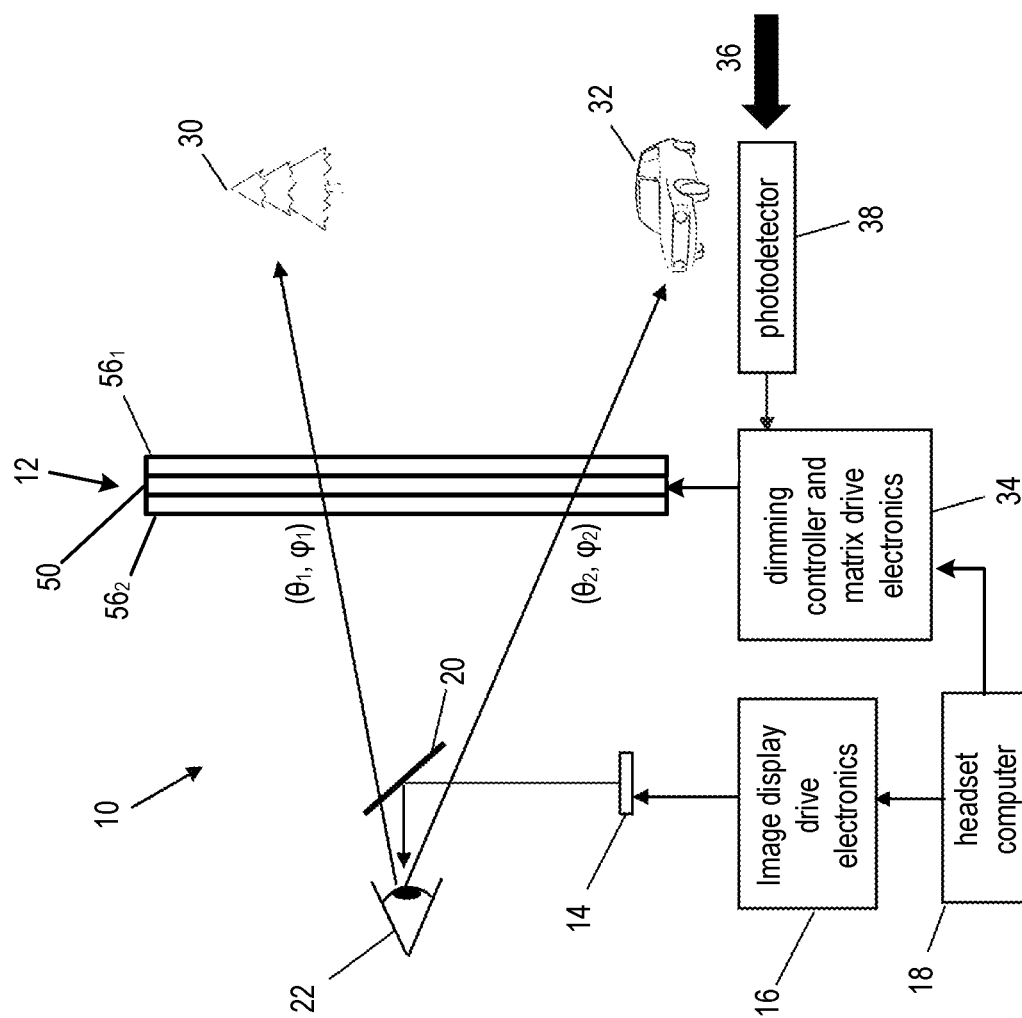
FIG. 1A is a diagrammatic view of a first embodiment of the disclosed dimming matrix display used in an AR headset.

FIG. 1A is a simplified diagram of the disclosed wearable viewing device that is configured in a preferred embodiment as an AR headset or glasses 10 (hereafter AR headset 10) using a dimming matrix display 12 functioning as a pixelated dimming filter. Details of imaging optics such as lenses and the like are omitted for clarity. A near-eye digital image display 14 installed in AR headset 10 receives electronic drive signals from image display drive electronics 16 to form an image in response to image input data provided by a headset computer 18 built into AR headset 10. Images coming from near-eye digital image display 14 are reflected from a partly transparent fold mirror 20 and are viewed by an observer 22. Observer 22 also views real-world objects 30 and 32 that are external to dimming matrix display 12. External object 30 is viewed through fold mirror 20 and can be superimposed on images from near-eye digital image display 14. Depending upon the relative size of fold mirror 20, external object 32 is viewed without the light passing through fold mirror 20. The relative size of fold mirror 20 is simply an optical design choice and depends upon the overall size and particular application of AR headset 10.

It will be appreciated that, from the perspective of observer 22, each viewing direction to the outside world passes through dimming matrix display 12 at a unique polar angle, azimuthal angle pair (θ, φ). The polar angle θ is defined as the angle between the viewing direction and the normal direction to dimming matrix display 12, and the azimuthal angle φ is the angle that the projection of the viewing direction on the plane of dimming matrix display 12 makes with a fixed direction lying in the plane of dimming matrix display 12. In the example of FIG. 1A, the line of sight for observer 22 viewing external object 30 intersects dimming matrix display 12 at polar and azimuthal angles $(\theta_1, \varphi_1)$, and the line of sight for observer 22 viewing external object 32 intersects dimming matrix display 12 at polar and azimuthal angles $(\theta_2, \varphi_2)$. It will be appreciated that these two intersection points pass through different pixels in dimming matrix display 12.

The amount of transmitted light of the individual pixels is determined by dimming controller and matrix drive electronics 34 in response to an amount of ambient light 36 striking a photodetector 38 mounted on AR headset 10. Dimming controller and matrix drive electronics 34 drives the pixels in dimming matrix display 12 with appropriate voltages so that the transmission of dimming matrix display 12, as perceived by observer 22, has a value within a narrow operational tolerance, i.e., a substantially constant value, for all viewing directions. This narrow operational tolerance of changes in amount of ambient light transmitted through the pixels of dimming matrix display 12 allows observer 22 to see external objects with sufficient dimming to prevent washout of the near-eye digital image when the outside illumination is very bright.

Figure 1B:
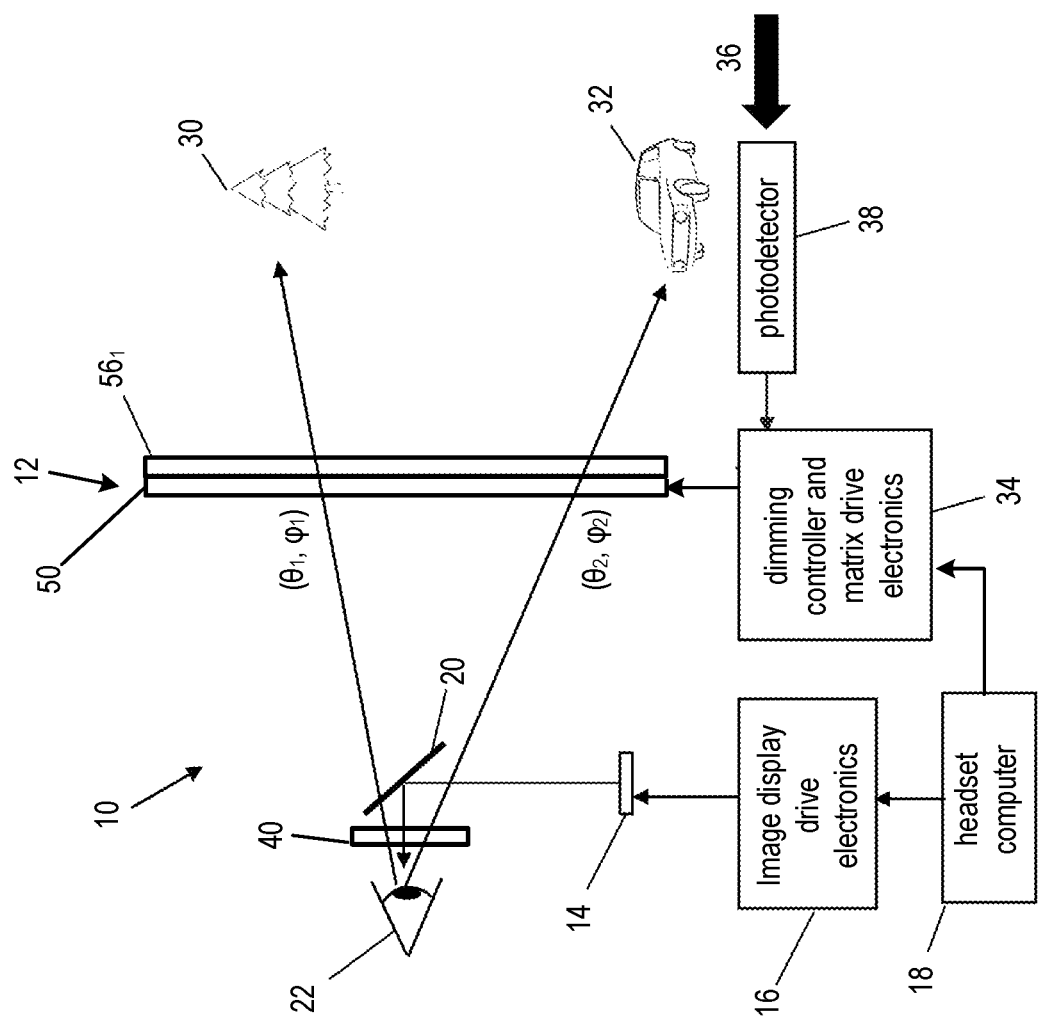
FIG. 1B is a diagrammatic view of a second embodiment of the disclosed dimming matrix display used in an AR headset.

Skilled persons will appreciate that AR headset 10 schematically illustrated in FIG. 1A can assume many forms in both design and implementation. Near-eye digital image display 14 can be of many different types including a transmissive AMLCD with backlight, an Organic Light Emitting Diode (OLED) array, a reflective Liquid Crystal on Silicon (LCoS) display, or a Digital Micromirror Display (DMD) array. Other embodiments are possible for use as near-eye digital image display 14, which embodiments traditionally have linear polarizers on their output faces for direct viewing applications, such as the AMLCDs and OLEDs used in cell phones. FIG. 1B shows a second embodiment, in which there is no light polarizer on the output face of near-eye digital image display 14 and a linear polarizer 40 is placed between the eye of observer 22 and partly transparent fold mirror 20. It is then possible to eliminate polarizer $56_2$ from the observer's side, i.e., the display output side, of dimming matrix display 12 shown in FIG. 2. The elimination of polarizer $56_2$ results in no polarization state blocking of incident light and, therefore, has the advantage of increasing the overall efficiency of the optical system. For the case of an OLED display, a glare-suppression quarter-wave plate typically positioned underneath the linear polarizer can also be eliminated.

Figure 1C:
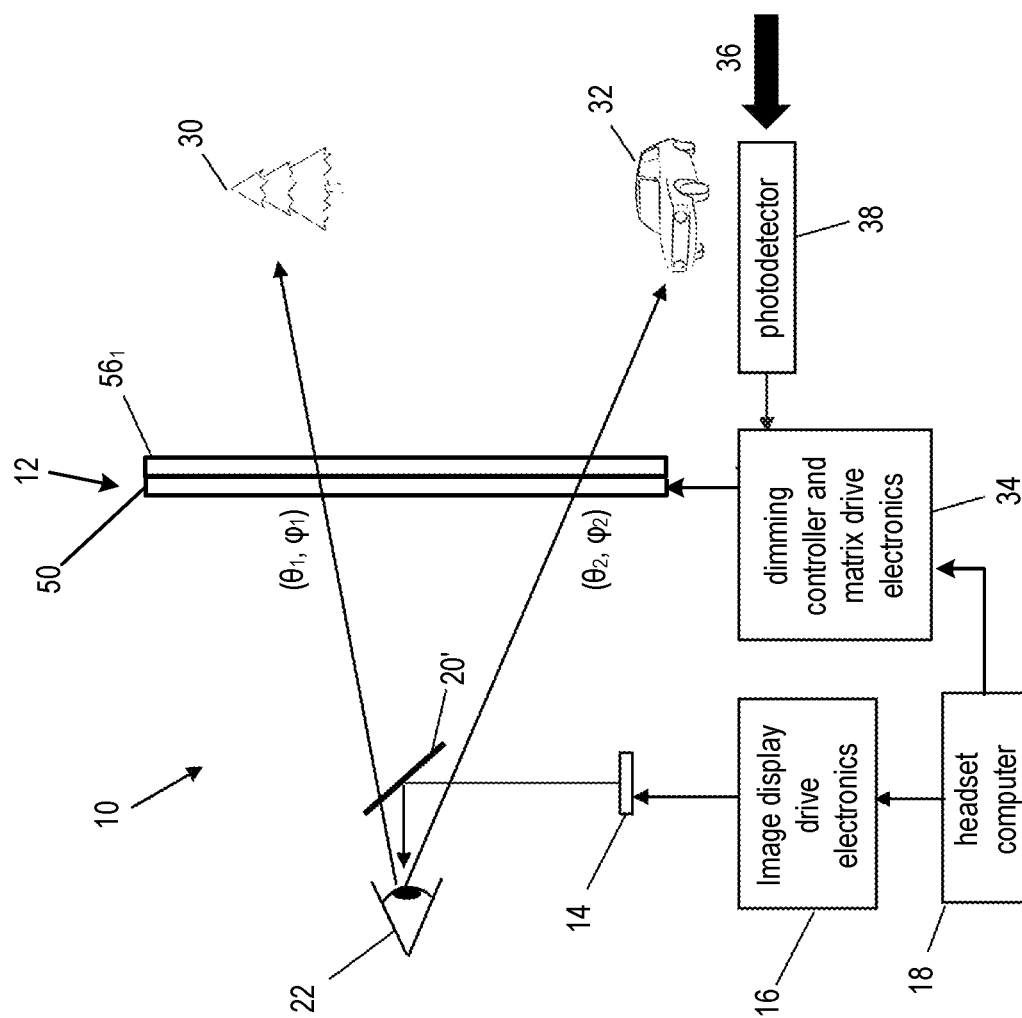
FIG. 1C is a diagrammatic view of a third embodiment of the disclosed dimming matrix display used in an AR headset.

FIG. 1C shows a third embodiment, in which linear polarizer 40 in the second embodiment of FIG. 1B is removed and partly transparent fold mirror 20 is replaced by a polarizing beamsplitter 20'.

Of course, the optical path for a near-eye reflective imaging device such as an LCoS display or a DMD array would need to be modified to include a light source to illuminate the output side of near-eye digital image display 14 with appropriate optics to reflect the image to observer 22. Dimming matrix display 12 is, in a first implementation, an AMLCD using the VAN mode with sufficient resolution and gray scale bit planes, and, in a second implementation, a twisted nematic (TN) LCD. An electrically controlled birefringence (ECB) mode could also be used. Dimming matrix display 12 could also be a direct-driven matrix using the electrically controlled birefringence (ECB) mode, the twisted nematic (TN) mode, or the guest-host (GH) mode, or a super-twisted nematic (STN) display in a passive matrix configuration, or a guest-host (GH) display in either an active or a passive matrix configuration. In addition, dimming matrix display 12 need not necessarily be flat, but could be curved in one or two dimensions to enable a more compact design and to give a distinctive appearance to AR headset 10. Moreover, dimming matrix display 12 can be configured with a large or limited number of pixels.

Figure 2:
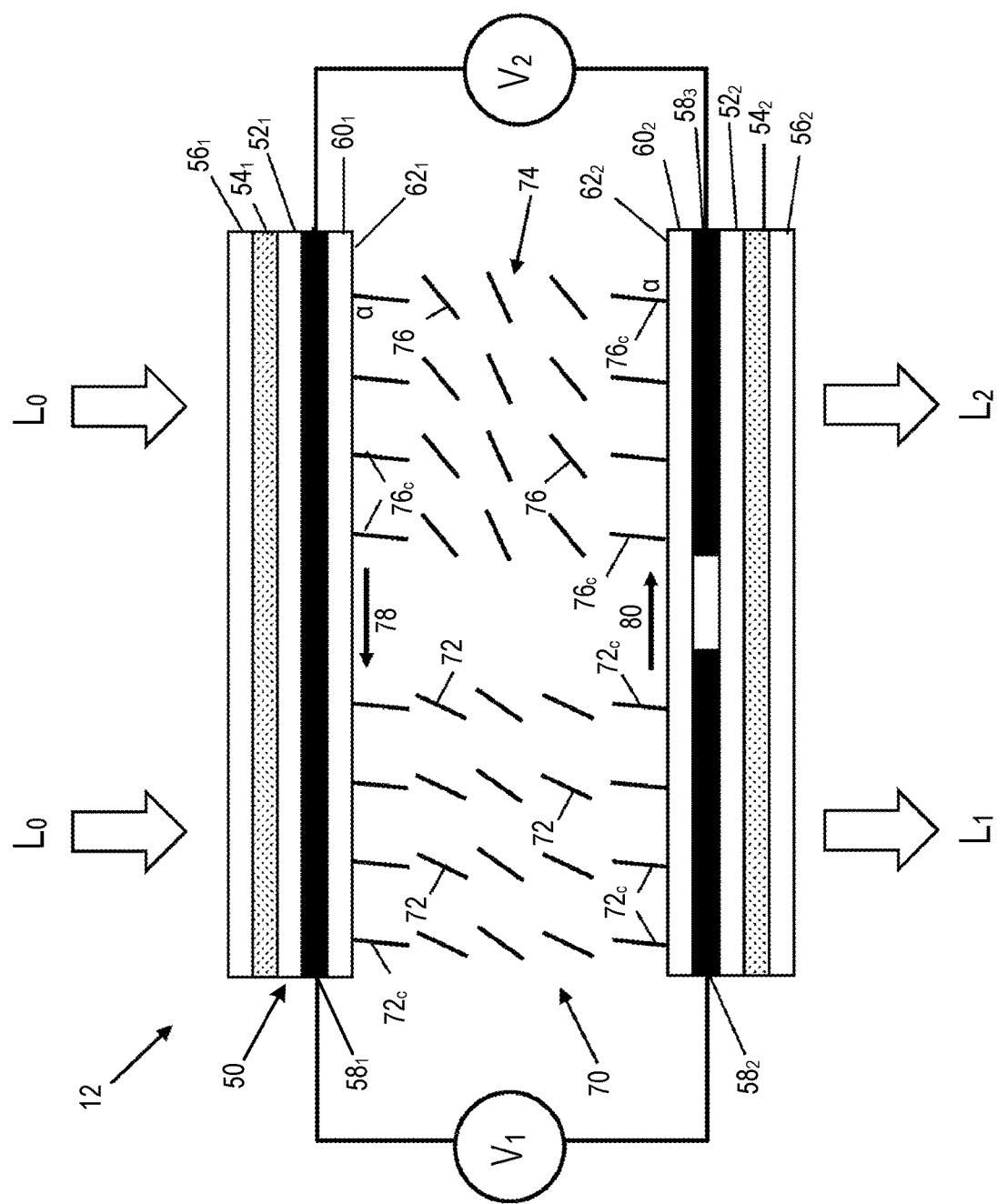
FIG. 2 is a diagrammatic side view of the disclosed dimming matrix display based on an AMLCD operating in the VAN mode with film compensation, showing two pixels operated at two different voltages resulting in two different dimmed luminance values L1 and L2.

FIG. 2 is a schematic diagram of the first implementation of dimming matrix display 12, which includes a single liquid crystal layer in a film-compensated VAN liquid crystal cell 50. VAN liquid crystal cell 50 has spaced-apart electrode structures that include substrate plates $52_1$ and $52_2$. A negative C retarder film $54_1$ is laminated onto substrate plate $52_1$, with the C axis of the retarder perpendicular to substrate plate $52_1$. A linear light polarizer $56_1$, with its transmission axis parallel to the plane of the drawing, is laminated onto negative C retarder film $54_1$. A positive A retarder film $54_2$, with its slow axis perpendicular to the plane of the drawing, is laminated onto substrate plate $52_2$. A linear light polarizer $56_2$, with its transmission axis perpendicular to the plane of the drawing, is laminated onto positive A retarder film $54_2$. An optically transparent electrode $58_1$ formed on substrate plate $52_1$ constitutes the common electrode, an interior surface on which is formed an alignment layer $60_1$. Optically transparent electrodes $58_2$ and $58_3$ formed on substrate plate $52_2$ constitute respective pixel electrodes $58_2$ and $58_3$, an interior surface on which is formed an alignment layer $60_2$. For the sake of clarity, only two pixel electrodes $58_2$ and $58_3$ are shown, not necessarily adjacent, out of the many pixels in film-compensated VAN liquid crystal cell 50. Alignment layers $60_1$ and $60_2$ have respective alignment surfaces $62_1$ and $62_2$.

For clarity, index-matching coatings of VAN liquid crystal cell 50, as well as the thin film transistor details associated with the pixel electrodes, are omitted from the diagram. In FIG. 2, a potential difference of $V_1$ volts applied between common electrode $58_1$ and pixel electrode $58_2$ gives rise to a director field 70 composed of liquid crystal directors 72 resulting in a transmitted luminance $L_1$, and a potential difference $V_2$ applied between common electrode $58_1$ and pixel electrode $58_3$ gives rise to a director field 74 composed of liquid crystal directors 76 resulting in a transmitted luminance $L_2$ at the display output side of dimming matrix display 12.

Surface-contacting liquid crystal directors 72, and 76, make pretilt angles α of preferably about 87°, measured from the substrate plane with their respective alignment surfaces $62_1$ and $62_2$. This type of alignment is commonly referred to as quasi-homeotropic alignment because the pretilt angle is close to 90°. Azimuthal directions of surface-contacting directors 72, and 76, are indicated by antiparallel arrows 78 and 80 and make +45° and −135° angles with the plane of the drawing. Incoming luminance $L_0$ is incident on the light input face linear polarizer $56_1$ at the display input side of dimming matrix display 12.

Skilled persons will appreciate that the range of viewing angles of a VAN liquid crystal cell can be improved by adding retarder films of various types and combinations on either side or both sides of the VAN liquid crystal cell. In the embodiment of FIG. 2, for example, negative C retarder film $54_1$ is positioned on one side of VAN liquid crystal cell 50, and positive A retarder film $54_2$ is positioned on the other side. Instead of this particular combination, a biaxial retarder film having the appropriate in-plane and out-of-plane retardation could also have been placed on either side or both sides of the VAN liquid crystal cell 50.

Figure 3:
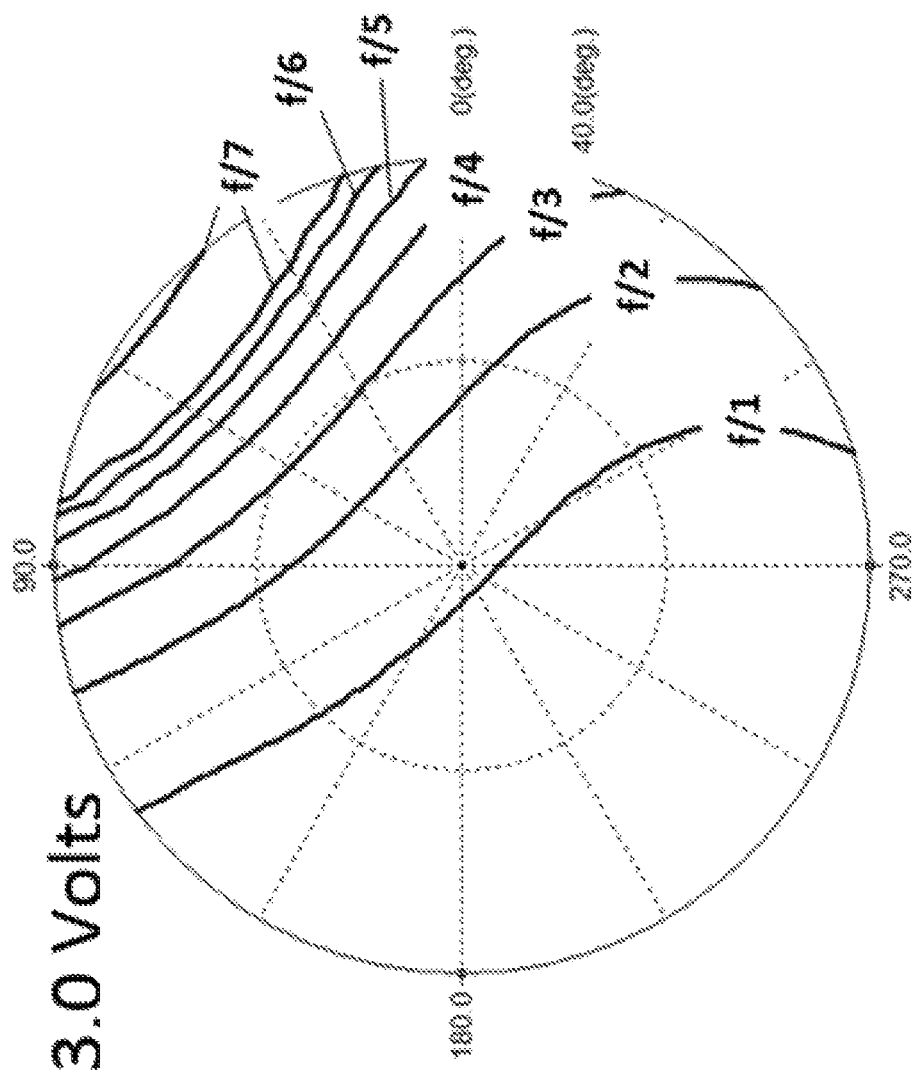
FIG. 3 shows a simulated iso-luminance angular viewing diagram for the case in which 3.0 volts is applied to all the pixels of the disclosed VAN mode dimming matrix display.

FIG. 3 shows a simulated iso-luminance diagram when the same 3.0 Volts is applied to all of the pixels of film-compensated VAN liquid crystal cell 50 of dimming matrix display 12 depicted in FIG. 2. The simulation is carried out using the commercial software LCD Master, available from Shintech Inc., Yamaguchi, Japan, specifying the liquid crystal material and cell parameters listed in the table below.

| Material and cell parameters used for simulations | | |
|---|---|---|
| Liquid crystal material | TEC92700-100 | |
| Birefringence | Δn (589 nm, 20° C.) | 0.080 |
| Extraordinary refractive index | $n_e$ (589 nm, 20° C.) | 1.556 |
| Ordinary refractive index | $n_o$ (589 nm, 20° C.) | 1.476 |
| Dielectric constant anisotropy | Δε (1 KHz, 25° C.) | −4.4 |
| Parallel dielectric constant | $ε_\|$ (1 KHz, 25° C.) | 3.6 |
| Perpendicular dielectric constant | $ε_+$ (1 KHz, 25° C.) | 8.0 |
| Splay elastic constant | $K_{11}$ | 14.4 pN |
| Twist elastic constant | $K_{22}$ | 7.1 pN |
| Bend elastic constant | $K_{33}$ | 19.1 pN |
| Pretilt angle | | 87° |
| Cell gap | | 4.0 μm |
| Negative C retarder | (nz − nx) · d | −180 nm |
| Positive A retarder | (nx − ny) · d | 190 nm |

The iso-luminance diagram shows the dependence of the transmitted luminance on the polar angle θ and the azimuthal angle φ of the light ray passing through a pixel of dimming matrix display 12, as depicted in FIG. 1, with the polar angles extending outward from the center of the diagram to 40° and the full range of azimuthal viewing angles going counterclockwise around the diagram from 0° to 360°. The center of the iso-luminance diagram corresponds to viewing the VAN liquid crystal cell 50 of dimming matrix display 12 at normal incidence.

FIG. 3 demonstrates that, from the perspective of observer 22, there is large viewing angle dependence of the transmitted luminance ranging from f-stop f/7 (0.78125%) on the upper right portion of the diagram to transmittances of over f/1 (50%) on the lower left portion of the diagram. Clearly, applying the same drive voltage to all pixels in this dimming filter would result in unacceptably large variations in brightness of the outside world scene to the wearer of AR headset 10.

Figure 4:
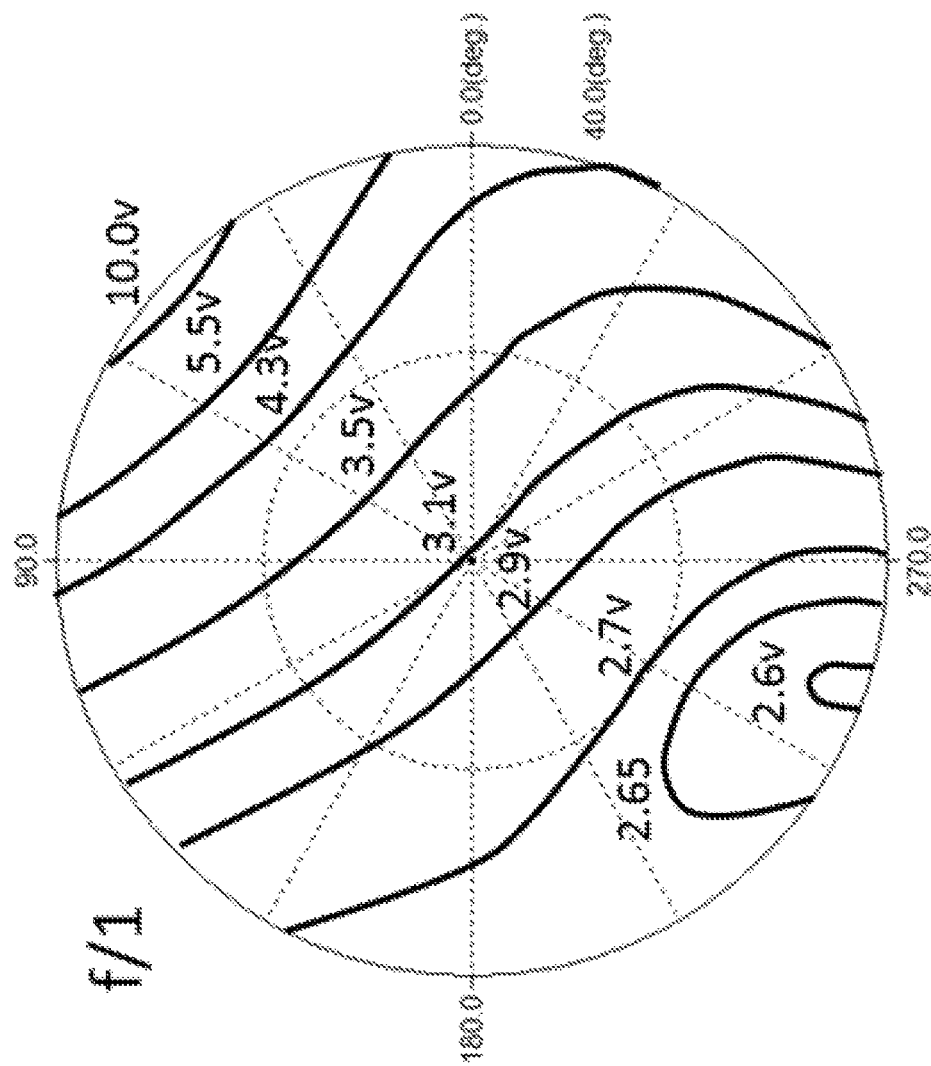
FIG. 4 shows a simulated iso-voltage angular viewing diagram of the disclosed VAN mode dimming matrix display for a transmitted luminance corresponding to an f-stop of 1 or 50%.
Figure 5:
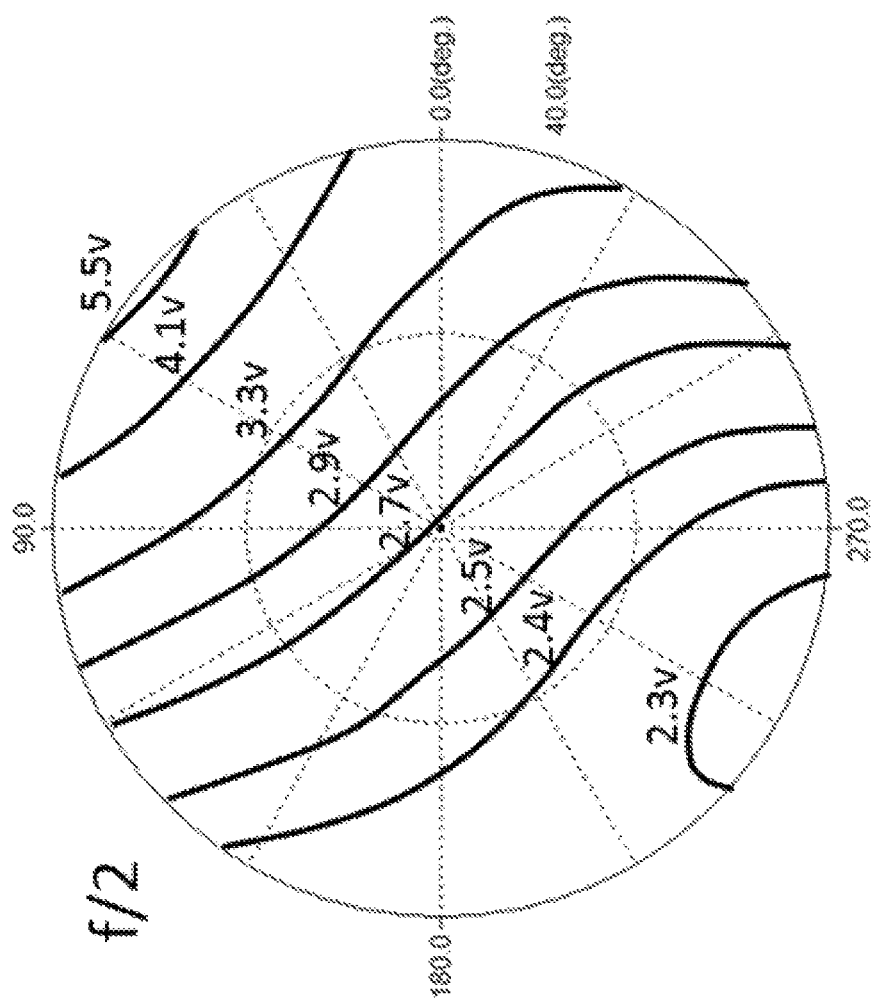
FIG. 5 shows a simulated iso-voltage angular viewing diagram of the disclosed VAN mode dimming matrix display for a transmitted luminance corresponding to an f-stop of 2 or 25%.
Figure 6:
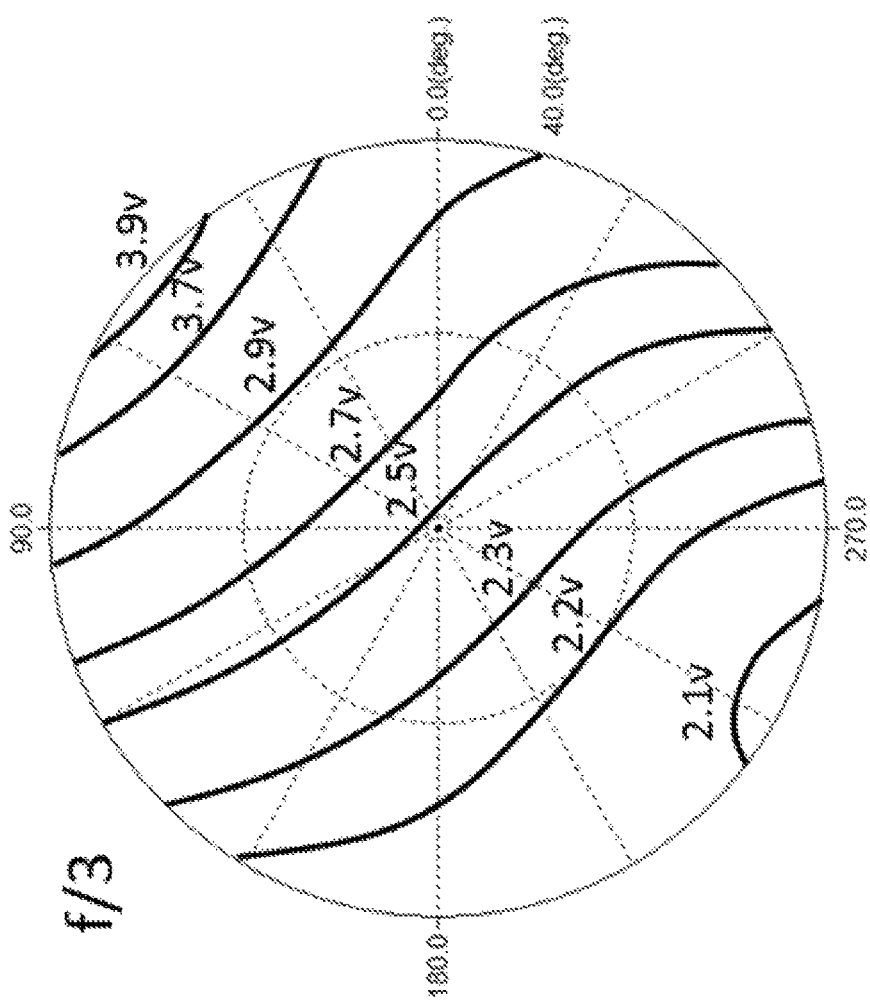
FIG. 6 shows a simulated iso-voltage angular viewing diagram of the disclosed VAN mode dimming matrix display for a transmitted luminance corresponding to an f-stop of 3 or 12.5%.
Figure 7:
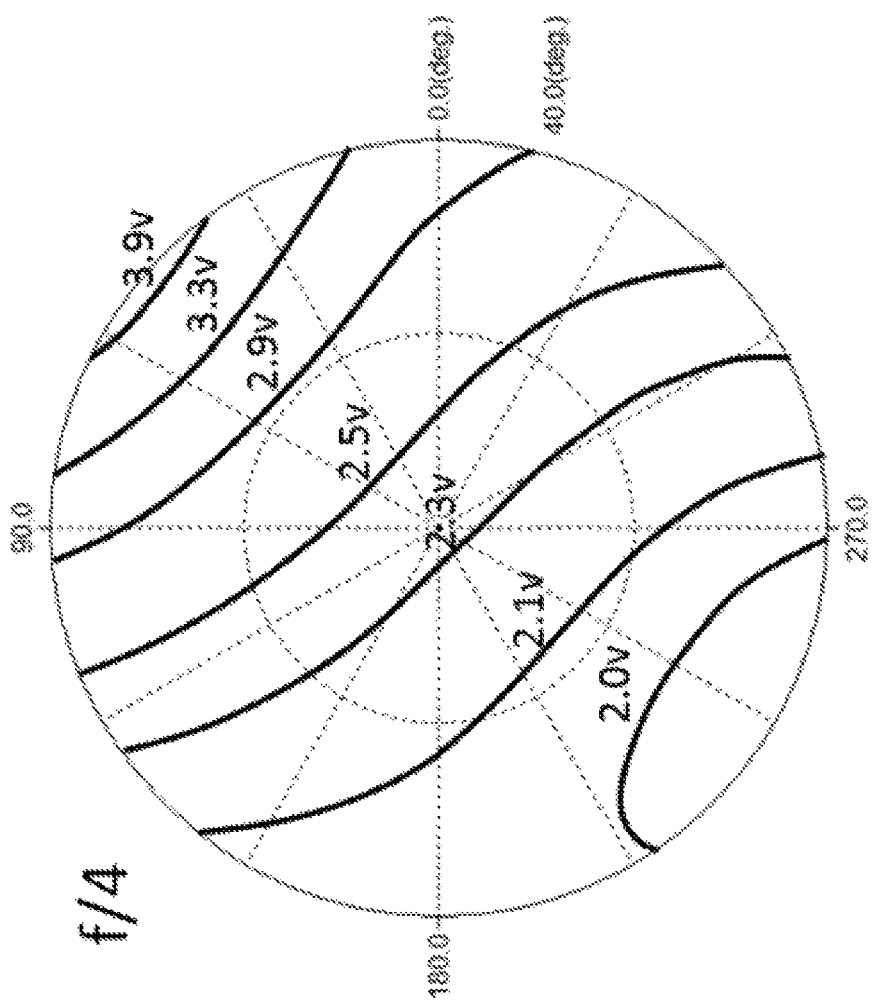
FIG. 7 shows a simulated iso-voltage angular viewing diagram of the disclosed VAN mode dimming matrix display for a transmitted luminance corresponding to an f-stop of 4 or 6.25%.
Figure 8:
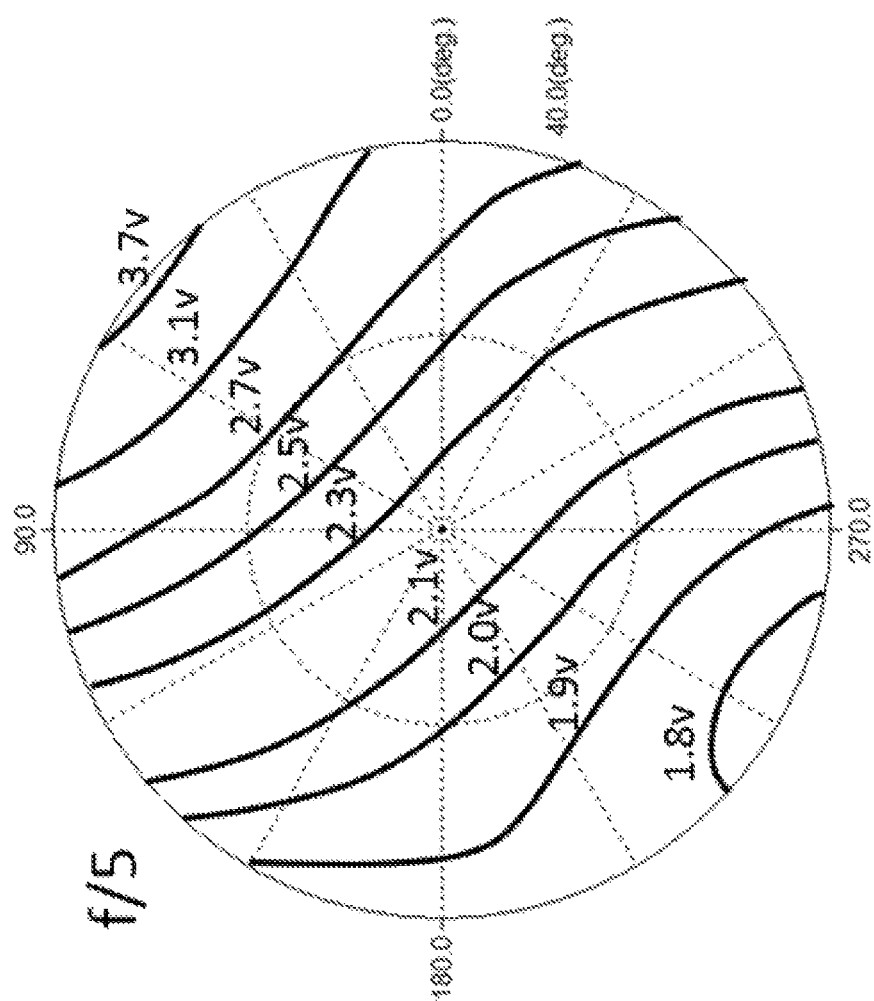
FIG. 8 shows a simulated iso-voltage angular viewing diagram of the disclosed VAN mode dimming matrix display for a transmitted luminance corresponding to an f-stop of 5 or 3.125%.
Figure 9:
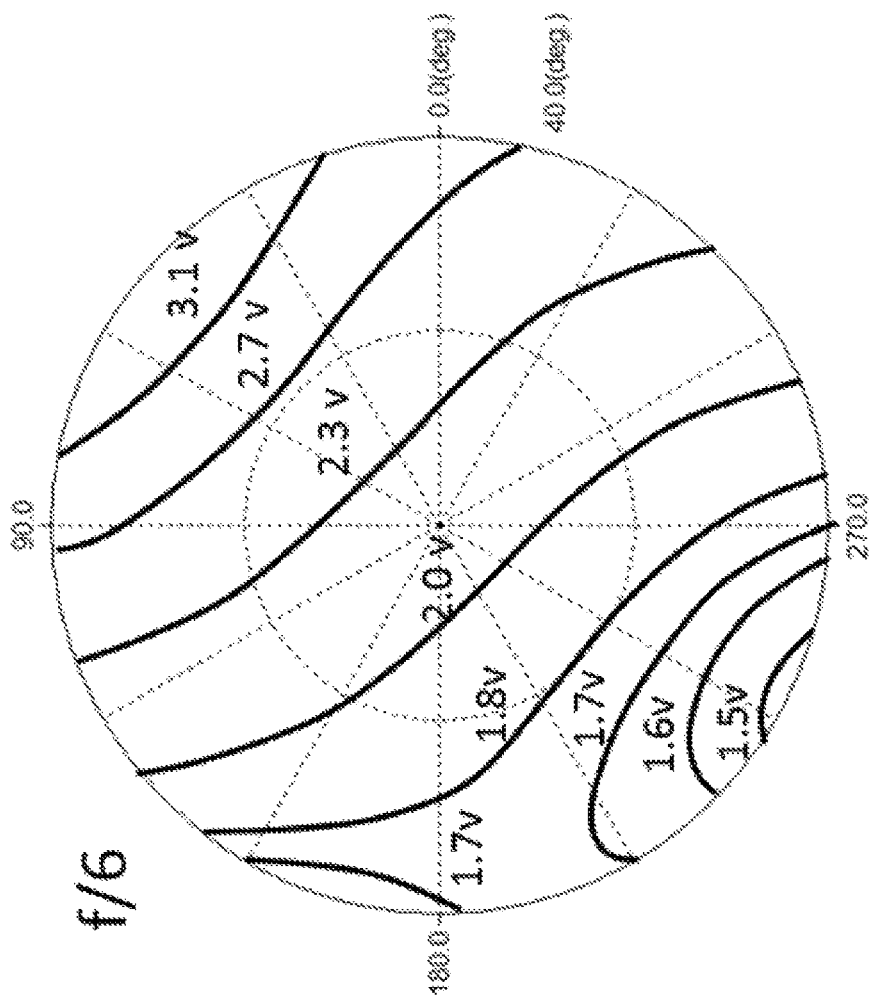
FIG. 9 shows a simulated iso-voltage angular viewing diagram of the disclosed VAN mode dimming matrix display for a transmitted luminance corresponding to an f-stop of 6 or 1.5625%.
Figure 10:
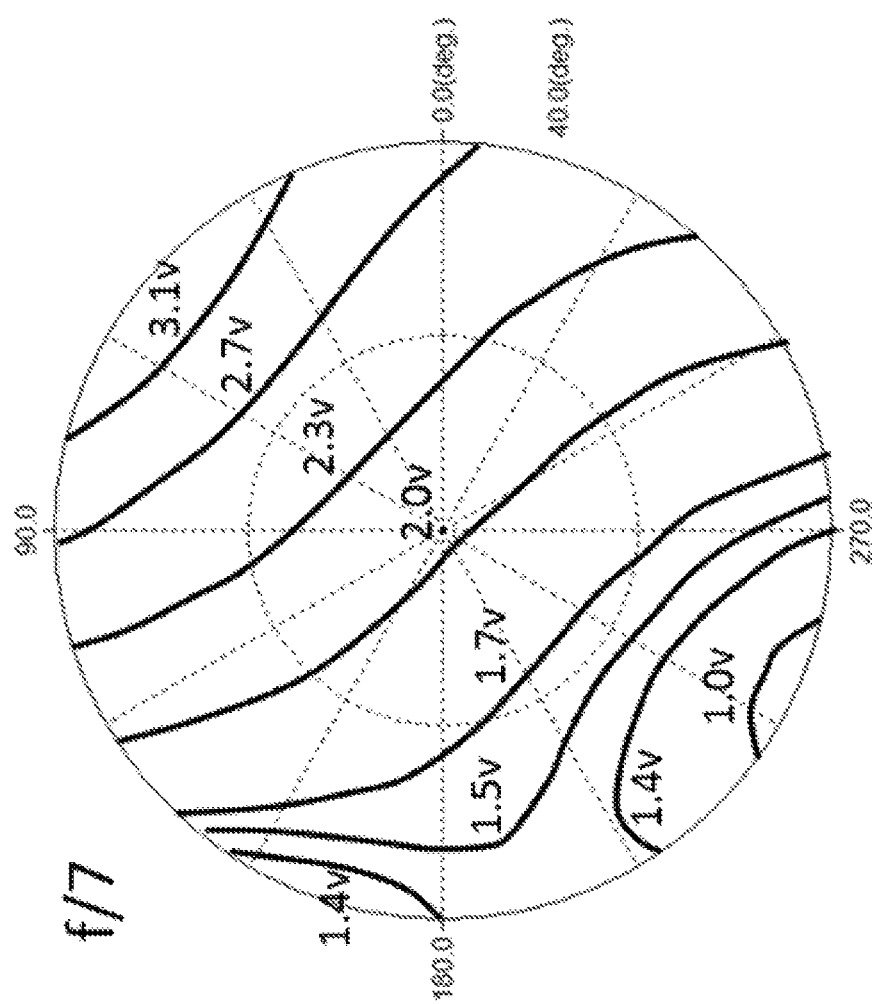
FIG. 10 shows a simulated iso-voltage angular viewing diagram of the disclosed VAN mode dimming matrix display for a transmitted luminance corresponding to an f-stop of 7 or 0.78125%.

Dimming matrix display 12 overcomes such large variations in brightness because it is a dimming filter of matrix design with a plurality of individual pixels, of which each pixel can be appropriately controlled so that observer 22 will see for each pixel the same transmitted luminance at all viewing directions. FIG. 4 depicts an iso-voltage diagram for the film-compensated VAN liquid crystal dimming matrix display 12 of FIG. 2, showing the voltages at various viewing angles that are applied to the pixels corresponding to those viewing angles to achieve a uniform f/1 (50%) transmittance for all viewing angles in the diagram. The particular dimming matrix display 12 in the design of AR headset 10 can be superimposed on this diagram to determine the one-to-one correspondence between the pixel location and its polar and azimuthal viewing angles with respect to observer 22. It will be appreciated that this correspondence will depend upon the resolution, size, and location of dimming matrix display 12 in the headset design. The viewing angle diagrams of FIGS. 3-10 are simulated for the configuration of VAN liquid crystal cell 50 disclosed in and described with reference to FIG. 2. Skilled persons will appreciate that these diagrams can be rotated by an arbitrary angle simply by rotating the polarizer transmission directions, the slow axis of positive A retarder film $54_2$, and the azimuthal directions 78 and 80 of the surface-contacting directors by that same arbitrary angle.

For reasons of clarity, fairly coarse voltage steps are presented by the voltage contours of FIG. 4. In the actual practice of designing headset computer 18, many more voltage contours may be computed to fill-in the gaps, and even finer voltage tuning may be accomplished by interpolation between these finer steps. All of this information relating to which voltage should be applied to which pixel to achieve a certain overall amount of dimming depending on the intensity of the external light could reside in memory locations of a look-up table in headset computer 18. It will be appreciated that, rather than relying on simulations to determine the required voltage at each pixel, one could also measure the required voltages in the actual dimming matrix display 12 used in AR headset 10.

FIGS. 4-10 show iso-voltage viewing angle diagrams in increments of unit f-stop steps of increased dimming from f/1 to f/7. For all these cases, it is possible to achieve, from the perspective of observer 22, uniform dimming over the wide angular viewing range of polar angles up to 40° and the full range of azimuthal angles 0°-360°. Skilled persons will appreciate that, at f-stop f/7 (FIG. 10), AR headset 10 essentially becomes a virtual reality (VR) headset since, for all practical purposes, the external surroundings are blocked out.

Figure 11:
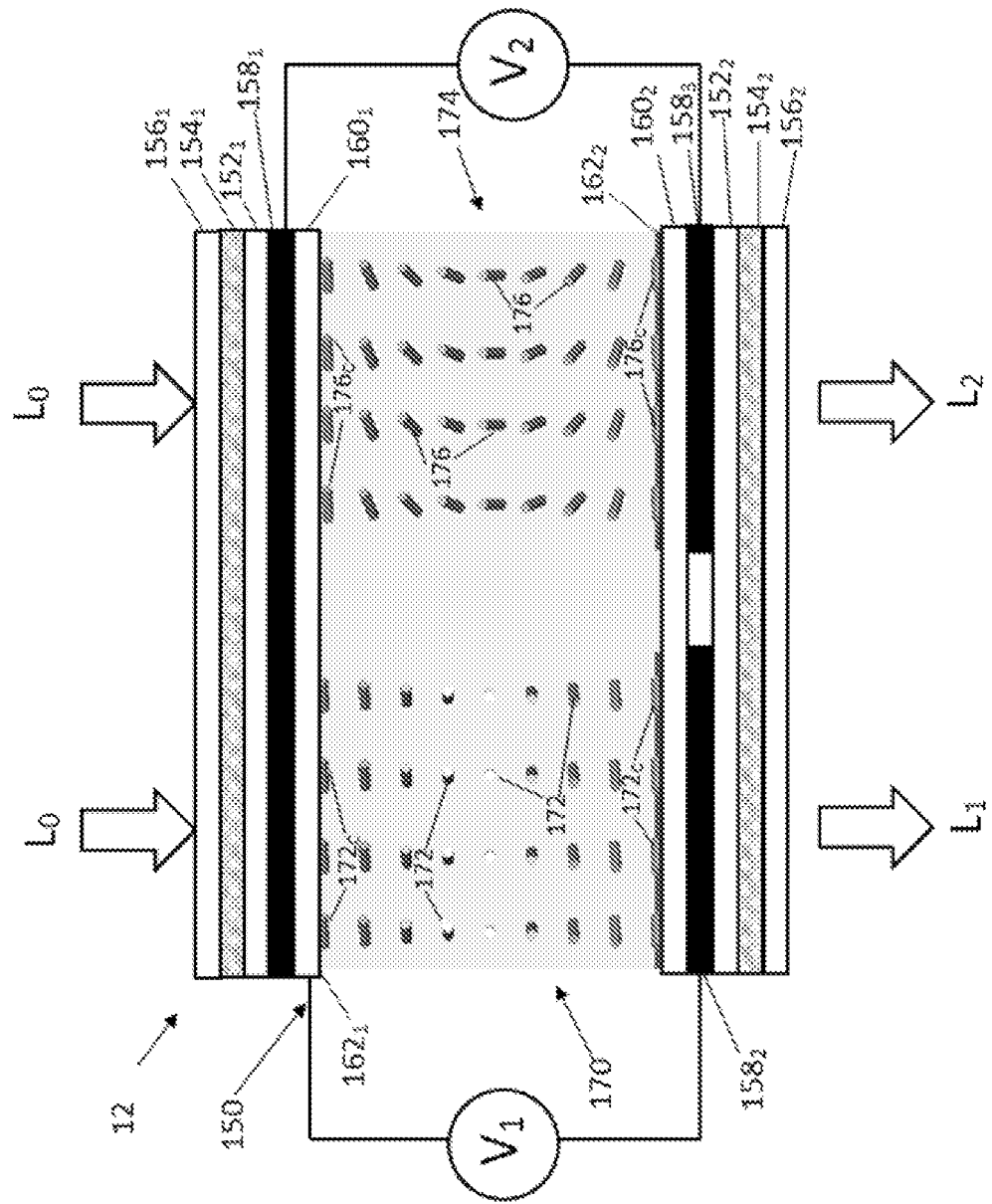
FIG. 11 is a diagrammatic side view of the disclosed dimming matrix display on an AMLCD operating in the twisted nematic (TN) mode with optional film compensation, showing two different pixels operated at two different voltages $V_1$ and $V_2$ resulting in two different dimmed luminance transmittance values $L_1$ and $L_2$.

FIG. 11 is a schematic diagram of the second implementation of dimming matrix display 12, which includes a single liquid crystal layer in a twisted nematic (TN) liquid crystal cell 150. TN liquid crystal cell 150 has spaced-apart electrode structures that include substrate plates $152_1$ and $152_2$. An optional retarder film $154_1$ is laminated onto substrate plate $152_1$. A first linear polarizer $156_1$, with its transmission axis set at +45° to the plane of the drawing, is laminated onto substrate plate $152_1$ or optional retarder film $154_1$. Another optional retarder film $154_2$ is laminated onto substrate plate $152_2$. A second linear polarizer $156_2$, with its transmission axis set at −45° to the plane of the drawing (i.e., crossed with the first linear polarizer $156_1$), is laminated onto substrate plate $152_2$ or optional retarder film $154_2$. An optically transparent electrode $158_1$ formed on substrate plate $152_1$ constitutes the common electrode, an interior surface on which is formed an alignment layer $160_1$. Optically transparent electrodes $158_2$ and $158_3$ formed on substrate plate $152_2$ constitute respective pixel electrodes $158_2$ and $158_3$, an interior surface on which is formed an alignment layer $160_2$. For the sake of clarity, only two pixel electrodes $158_2$ and $158_3$ are shown, not necessarily adjacent, out of the many pixels in TN liquid crystal cell 150. Alignment layers $160_1$ and $160_2$ have respective alignment surfaces $162_1$ and $162_2$.

For clarity, index-matching coatings of TN liquid crystal cell 150, as well as the thin film transistor details associated with the pixel electrodes, are omitted from the diagram. In FIG. 11, a potential difference of $V_1$ volts applied between common electrode $158_1$ and pixel electrode $158_2$ gives rise to a director field 170 composed of liquid crystal directors 172 resulting in a transmitted luminance $L_1$, and a potential difference $V_2$ applied between common electrode $158_1$ and pixel electrode $158_3$ gives rise to a director field 174 composed of liquid crystal directors 176 resulting in a transmitted luminance $L_2$. Surface-contacting liquid crystal directors 172, and 176, make azimuthal angles +45 and −45 with respect to the plane of the drawing and pretilt angles of preferably about 2°, measured from the substrate plane. Incoming luminance $L_0$ is incident on the light input face of linear polarizer $156_1$.

Figure 12:
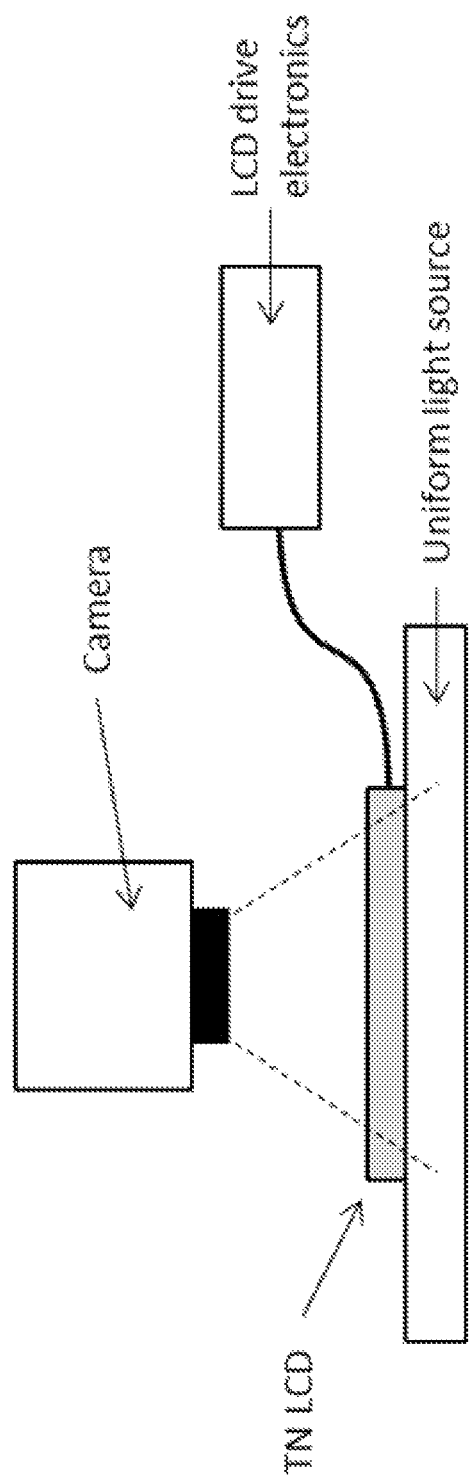
FIG. 12 shows a diagrammatic view of a setup of instruments used to measure gray level uniformity that would be perceived by an observer's eye when it is only 30 mm from the dimming matrix display.

FIG. 12 shows an experimental setup of instruments used to measure gray level uniformity of dimming matrix display 12 including TN liquid crystal cell 150. The experimental setup uses a camera positioned a distance of about 30 mm away from dimming matrix display 12 to mimic the position of the human eye in a typical AR/VR geometry, in which the individual pixels would be viewed over a range of polar and azimuthal angles (θ, φ). A light table placed behind dimming matrix display 12 provided uniform, omnidirectional illumination. The pixels of TN liquid crystal cell 150 were individually driven by the LCD drive electronics, making it possible to adjust the gray level driven to each pixel to provide a uniform-appearing gray level for the pixels seen by the camera.

The experimental results obtained revealed that for this particular TN display under test, with all pixels written to the same gray level, the luminance non-uniformity viewed by the camera is significantly stronger along the vertical direction than along the horizontal direction. For this case, it was necessary only to adjust the gray levels written to the display rows along the vertical direction to achieve an adequate uniformly gray field-of-view, as seen from the standpoint of the camera.

Figure 13:
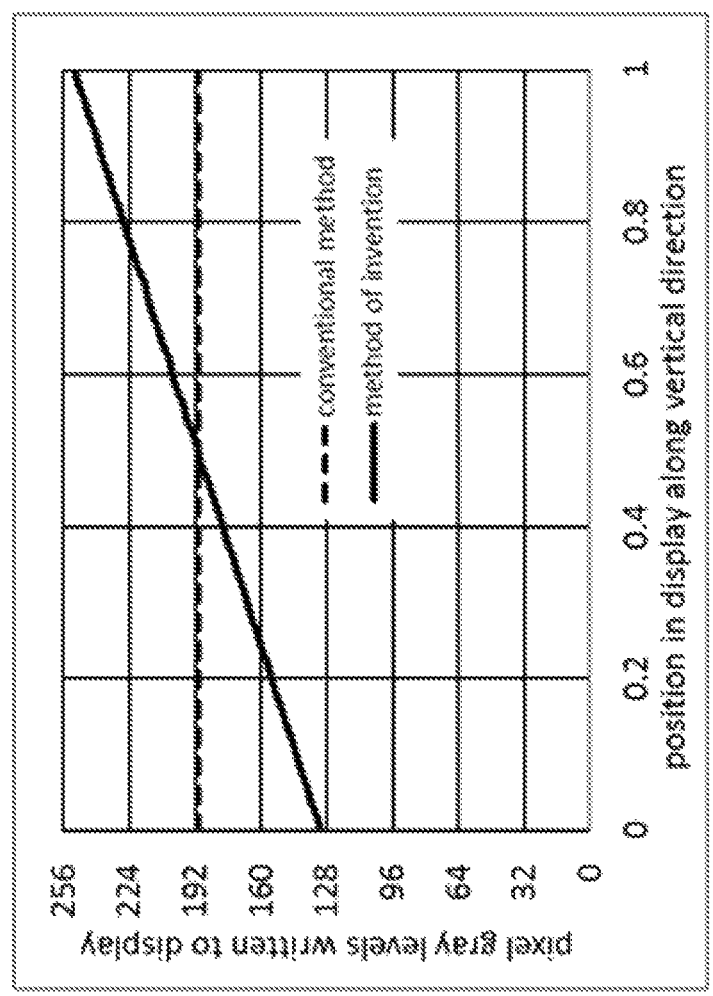
FIG. 13 is a graph showing a comparison of the gray levels written to the pixels of the TN LCD of FIG. 11 using the conventional method in which gray level 191 is written to all pixels of the display and using the disclosed method in which gray levels ranging from 128 to 251 are written to pixel rows from bottom to top in order to achieve a uniform perceived gray level when viewed by the eye in an augmented reality/virtual reality (AR/VR) configuration.
Figure 14:
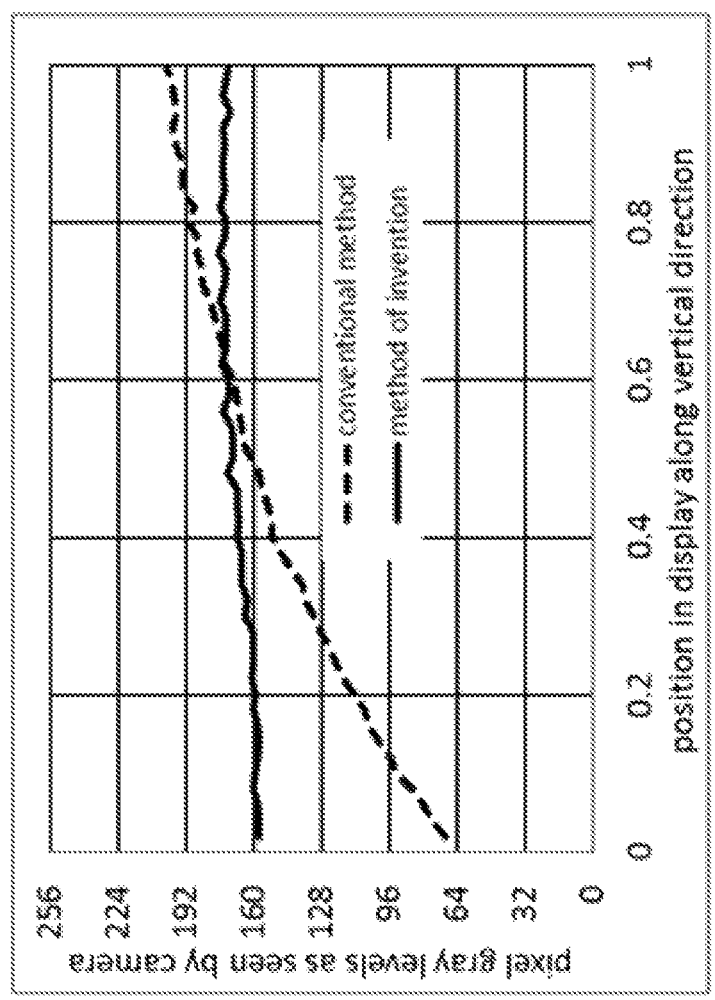
FIG. 14 is a graph showing a comparison of the uniformity of perceived gray levels in the vertical direction using the conventional method and the disclosed method of controlling effects of environmental lighting conditions.
Figure 15:
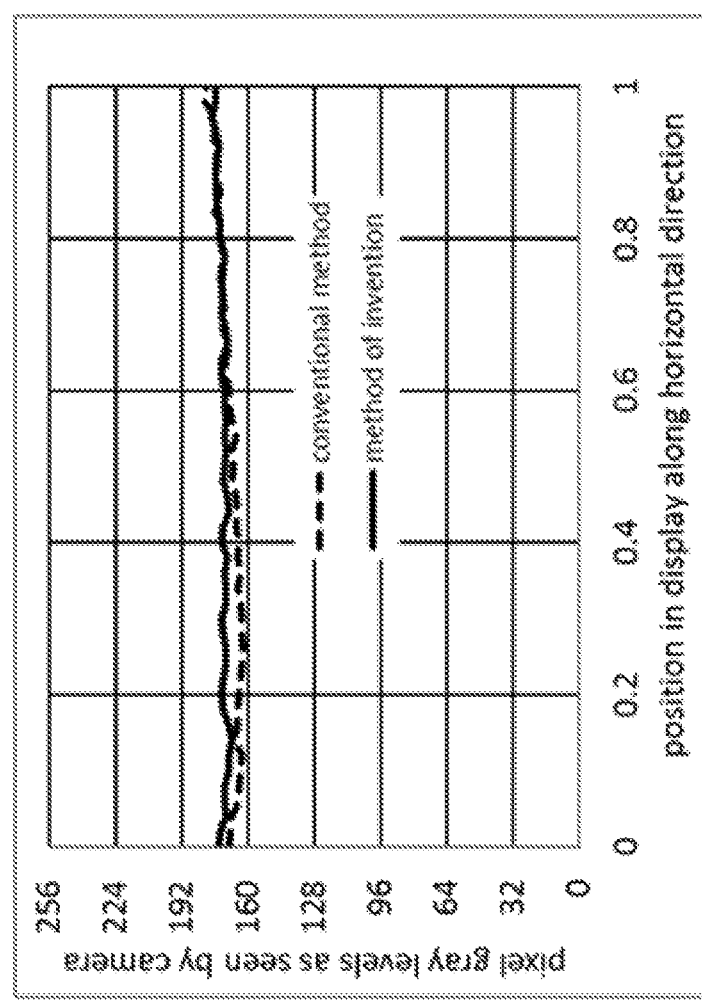
FIG. 15 is a graph showing a comparison of the uniformity of perceived gray levels in the horizontal direction using the conventional method and the disclosed method of controlling effects of environmental lighting conditions.

FIG. 13 is a graph showing an example in which it is desired to drive dimming matrix display 12 to a constant gray level 191 in an 8-bit system (i.e., gray level 191 from the gray level range of 0 to 255). Using the conventional method would result in all of the pixels of the display area of TN liquid crystal cell 150 being driven to gray level 191 (dotted line in FIG. 13). This would automatically be the case if TN liquid crystal cell 150 were not pixelated, formed with only a single upper electrode and a single lower electrode. However, using the disclosed method results in the pixels on the display rows at the very bottom of dimming matrix display 12 (0 on x-axis of graph) being written to gray level 131, and moving upwards, the written gray levels being gradually increased finally to gray level 251 at the very top of the display (1 on x-axis of graph). The perceived gray level of these two different drive methods from the standpoint of the camera can be seen by comparing the two curves shown in FIG. 14. The perceived gray levels using the conventional drive method (dotted line in FIG. 14) are considerably less uniform than the perceived gray levels using the disclosed method (solid line in FIG. 14). FIG. 15 is a graph showing that there is only a small amount of variation in the perceived gray level in the horizontal direction using the disclosed method. Of course, even better perceived gray level uniformity could be made by writing different gray levels across the display rows, instead of driving each row at a constant gray level. The written gray levels at 191 in FIG. 13 do not correspond to the same measured gray levels at about 160 in FIGS. 14 and 15 because of filter gamma settings and camera sensor properties.

Although the foregoing description is directed to an AR headset, other preferred embodiments of wearable viewing devices include variable sunglasses or sports eyeglasses configured for use with the disclosed dimming matrix display.

It will be obvious to those having skill in the art that many changes may be made to the details of the above-described embodiment without departing from the underlying principles of the invention. As a first example, direct-driven pixelated display designs implemented with a small number of pixels could be used. As a second example, controlled localized dimming of selected pixels at the position of virtual content can ensure legibility of the virtual content displayed. Improved performance of localized dimming can be achieved by use of an ancillary camera operating in communication with the headset computer, the ancillary camera looking at the light level in the direction where virtual content is shown. The scope of the present invention should, therefore, be determined only by the following claims.

The invention claimed is:

1. In a wearable viewing device, a system for preventing a reduction in legibility of a near-eye image display for observation in combination with an observer's visual exterior view, comprising:
   a near-eye image source from which emanates near-eye image-carrying light, the near-eye image source positioned out of the observer's direct visual exterior view;
   a dimming matrix display including multiple pixels and positioned so that the observer can see the exterior view through the multiple pixels, the exterior view including a scene, and locations in the scene viewed by the observer defining lines of sight for the observer, the lines of sight intersecting and passing through the multiple pixels at polar and azimuthal angles;
   a partly transparent optical element positioned so that the observer can see the scene in the visual exterior view and so that the near-eye image-carrying light reflects off the partly transparent optical element to provide an image for observation by the observer; and
   a dimming controller operatively connected to the dimming matrix display to control amounts of scene-carrying light propagating through the multiple pixels from the locations in the scene, so that the scene-carrying light, as perceived by the observer, has for the lines of sight passing through the multiple pixels at their respective polar and azimuthal angles a value within an operational tolerance that prevents wash-out of the near-eye image when outside illumination is very bright.

2. The viewing device of claim 1, in which the dimming matrix display comprises a liquid crystal cell including first and second spaced-apart electrode structures that are positioned, respectively, nearer to and farther from the partly transparent optical element, and further comprising a light polarizer placed on the second electrode structure.

3. The viewing device of claim 2, in which the light polarizer placed on the first electrode structure constitutes a first light polarizer, and further comprising a second light polarizer placed on the second electrode structure.

4. The viewing device of claim 1, in which the dimming matrix display has a display output side set nearer to and a display input side set farther from the observer, and further comprising a light polarizer positioned between the partly transparent optical element and the observer and no light polarization state blocking device positioned on the display output side of the dimming matrix display.

5. The viewing device of claim 4, in which the dimming matrix display has a display output side set nearer to and a display input side set farther from the observer, the partly transparent optical element includes a polarizing beamsplitter, and no light polarizing state blocking device is positioned on the display output side of the dimming matrix display.

6. The viewing device of claim 1, in which the near-eye image source includes a light transmissive source.

7. The viewing device of claim 6, in which the light transmissive source is a liquid crystal matrix display or an organic light emitting diode array.

8. The viewing device of claim 1, in which the near-eye image source includes a light reflective source.

9. The viewing device of claim 8, in which the light reflective source is a liquid crystal on silicon display or a digital micromirror display array.

10. The viewing device of claim 1, in which the dimming matrix display includes a vertically aligned nematic liquid crystal display.

11. The viewing device of claim 1, in which the dimming matrix display includes a twisted nematic liquid crystal display.

12. The viewing device of claim 1, further comprising a photodetector that is responsive to an amount of ambient light and operates in cooperation with the dimming controller to enable it to control the amounts of scene-carrying light propagating through the multiple pixels.

13. The viewing device of claim 1, configured as a wearable augmented reality (AR) viewing device.

* * * * *